United States Patent [19]

Swenson

[11] Patent Number: 4,973,234
[45] Date of Patent: Nov. 27, 1990

[54] SHELL MOLD MECHANISM

[75] Inventor: Harold W. Swenson, Dover, N.H.

[73] Assignee: Davidson Textron Inc., Dover, N.H.

[21] Appl. No.: 424,946

[22] Filed: Oct. 23, 1989

[51] Int. Cl.⁵ .................. B29C 33/16; B29C 39/10
[52] U.S. Cl. .................................. 425/3; 249/93; 249/94; 264/46.8; 425/111; 425/117; 425/DIG. 48
[58] Field of Search .......... 425/111, 116, 117, 125, 425/4 R, 817 R, 388, DIG. 29, DIG. 48, DIG. 33, 3; 264/66.5, 46.6, 46.7, 46.8; 249/93, 91, 94

[56] References Cited

U.S. PATENT DOCUMENTS

| | | | |
|---|---|---|---|
| 4,195,046 | 3/1980 | Kesling | 264/16 |
| 4,465,710 | 8/1984 | Uchiyama et al. | 264/46.5 |
| 4,544,126 | 10/1985 | Melchert | 249/171 |
| 4,608,744 | 9/1986 | Nemoto | 425/DIG. 33 |
| 4,653,718 | 3/1987 | Dickens | 249/95 |
| 4,673,542 | 6/1987 | Wigner et al. | 264/46.7 |
| 4,836,495 | 6/1989 | McCormack | 249/83 |
| 4,844,853 | 7/1989 | Ito et al. | 425/DIG. 33 |

Primary Examiner—Jay H. Woo
Assistant Examiner—Khanh P. Nguyen
Attorney, Agent, or Firm—John C. Evans

[57] ABSTRACT

Apparatus for stabilizing the location of a skin or shell in a mold for foaming a part includes magnets on the mold adapted to be releasably interconnected to a shell retention and draw bar. The draw bar connects to an integral shell connector. The draw bar is adjustable to pull the shell with respect to the magnets for removing wrinkles from the shell prior to foaming the part.

5 Claims, 2 Drawing Sheets

SHELL MOLD MECHANISM

FIELD OF THE INVENTION

This invention relates to apparatus for forming a composite plastic product including an outer shell and a layer of plastic foam bonded to the outer shell and more particularly to apparatus for stabilizing an outer shell within the mold prior to foaming in order to prevent wrinkling of the outer shell during the mold process.

BACKGROUND ART

U.S. Pat. Nos. 4,089,919; 4,114,213; and 4,793,793 disclose apparatus for foaming a shell component. The shell component is inserted into a cavity mold and is held in place therein by providing a plurality of vacuum ports in the cavity mold which, when activated, will draw the shell component against the cavity mold.

U.S. Pat. No. 4,755,120 discloses seat foam molding apparatus that combines vacuum retention with push bars to hold cover material in the mold. U.S. Pat. Nos. 4,806,088 and 4,808,100 disclose gate apparatus for assisting placement of a textile cover over a female mold followed by vacuum forming of the cover on the mold.

U.S. Pat. No. 4,260,576 discloses a mold apparatus that has a holding pin for connecting a metal top of a ski in a mold for molding a fiberglass epoxy resin to the metal top.

U.S. Pat. No. 4,115,170 discloses a foam mold having strips interposed between cover sheets for fastening the cover sheets within a mold apparatus.

U.S. Pat. No. 4,116,736 discloses mold apparatus having clamps for securing an elastic membrane to the periphery of the mold.

U.S. Pat. Nos. 4,195,046 and 4,544,126 disclose a magnet in a mold apparatus for locating a reinforcing insert therein with respect to mold halves utilized in the molding process. There is no suggestion of providing means in association with the magnets to remove wrinkles from a flexible skin or shell component.

In the manufacture of many composite products, a flexible skin or shell component is placed in the mold prior to directing foam precursors into the mold for forming a foam layer against the back of the skin layer. Currently, vinyl skins are held in place in a pour mold member by use of masking tape or vacuum as set forth in the above-identified -793 patent. However, in certain cases where the skin is thick or the retainers have variable dimensions, the skin can be pulled into the cavity when the mold closes to cause wrinkles to develop in the skin. Such wrinkles are retained in the final composite product once the foam layer is molded against the back side of the wrinkled skin. Such products must be scrapped. In the case of products such as instrument panels or other automotive interior products, the cost of such scrap material can be substantial.

SUMMARY OF THE INVENTION

In order to solve the problem of uncontrolled wrinkles which can result in scrap material of such composite products, it is an object of the present invention to provide a manually adjustable draw bar which supplements vacuum hold down parts in mold apparatus to prevent wrinkles in a flexible skin or shell component inserted in a mold.

Another feature of the present invention is to provide for elimination of wrinkles in a skin or shell cover of a foamed product by the provision of a skin having a connector formed integrally thereon for connection to a draw bar and wherein the draw bar is releasably and adjustably secured to the mold by magnet means for preventing wrinkles in the skin when the mold is closed in preparation for forming a foamed layer against the back side of the skin once retained in the mold.

A further feature of the present invention is to provide apparatus for removing wrinkles from a vinyl skin or shell for forming the outer surface of a mold composite foam product and wherein the vinyl shell includes a first surface portion conformable to the surface of a mold and a second surface portion which is locatable over the perimeter portions of the mold; the apparatus includes a draw bar connectable to the skin and a magnetic member on the mold to lock the draw bar to the mold to remove wrinkles from the skin and to prevent the shell from being drawn into the mold cavity thereby to prevent wrinkling of the outer surface of a composite foam product and resultant scrapping of a defective product.

These and other features and advantages and objects of the invention will be more apparent when taken in conjunction with the following detailed description of the invention along with reference to the accompanying drawings.

DETAILED DESCRIPTION OF THE PREFERRED EMBODIMENT

Figure 1:
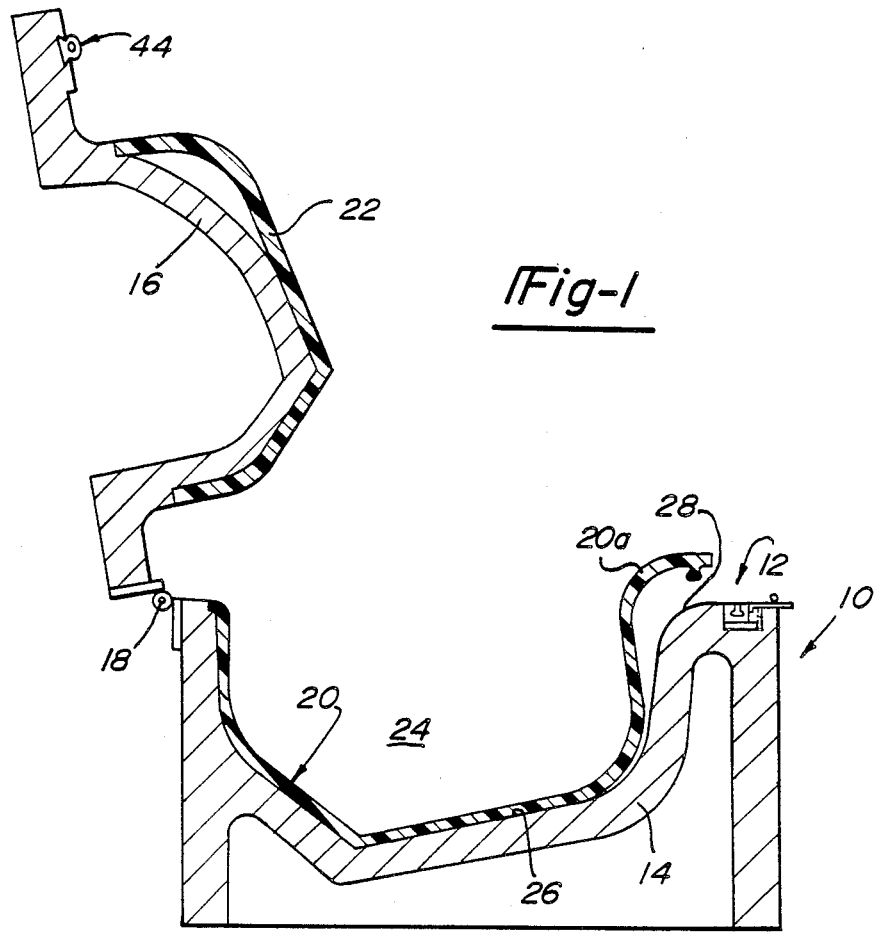
FIG. 1 is a cross-sectional view of a mold apparatus including the present invention.
Figure 2:
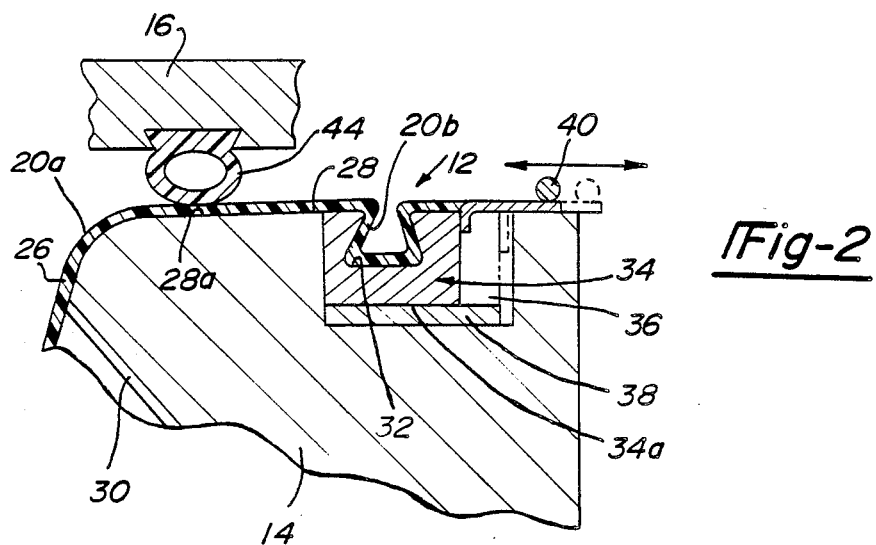
FIG. 2 is an enlarged fragmentary sectional view of a shell component interconnected to mold apparatus.
Figure 3:
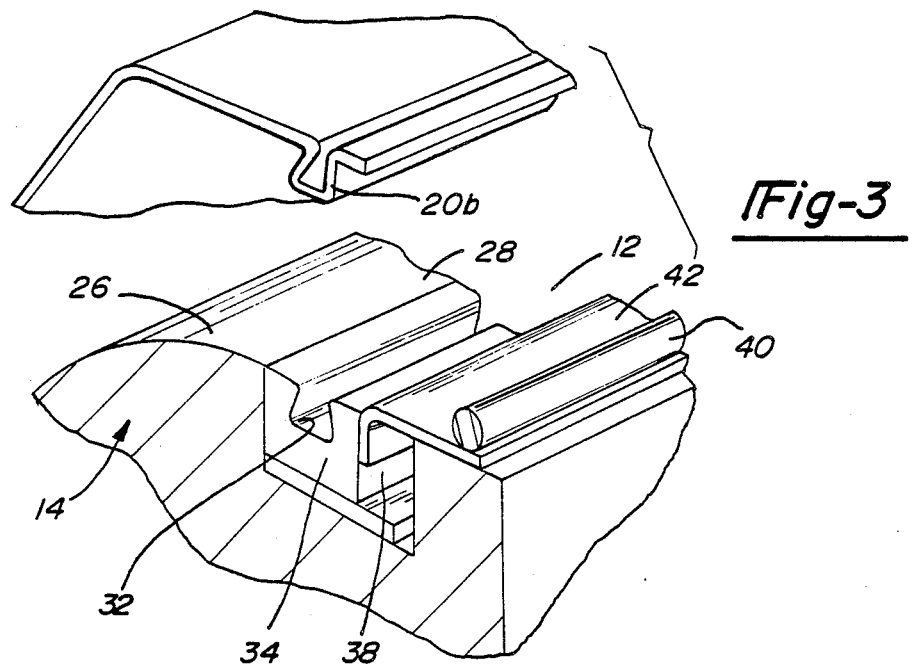
FIG. 3 is an enlarged fragmentary perspective view of the apparatus of the present invention prior to connection to and adjustment of a shell component in the mold apparatus.
Figure 4:
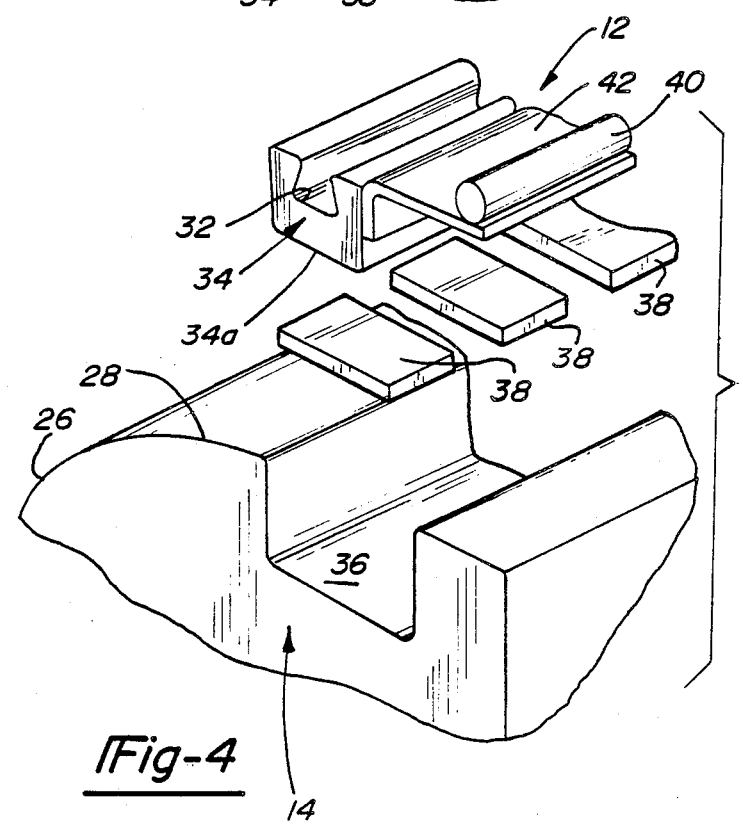
FIG. 4 is an exploded view of the component parts of the present invention.

Referring now to FIG. 1, a mold apparatus 10 is illustrated including the vinyl shell load mechanism 12 of the present invention. The mold apparatus 10 includes a mold cavity 14 with a lid 16 connected thereto by a hinge 18. The lid 16 is moveable between the opened position in FIG. 1 for loading a shell or skin component 20. The lid has a closed position in which an insert 22 carried on the lid 16 is located in spaced relationship with the shell 20 to form a space 24 therebetween for receiving foam precursors. The foam precursors will react in the space 24 to fill it with a layer of foam that will bond to both the shell 20 and the insert 22. The mold apparatus 10 is illustrative of foam molding apparatus in which a flexible or pliable shell is located to form the outer cover of a resultant composite foam product.

Examples of such products are arm rests, consoles, crash pads, and doors used as interior trim of automobiles. The foam molding apparatus can take other forms than that illustrated with it being understood that the present invention is directed to such mold apparatus with a cavity surface 26 and a peripheral surface 28 on which the shell 20 must be loaded wrinkle free prior to foaming the composite product.

In accordance with the present invention the shell load mechanism 12 locates the shell 20 in the mold cavity 14 and will hold it therein so that wrinkles will be eliminated. Consequently, the finished part will have a smooth, high quality outer surface appearance and parts will not have to be scrapped.

More specifically the shell load mechanism 12 is associated with a vacuum port 30 located in the mold cavity 14 inboard of the peripheral surface 28. The vacuum port 30 is connected to a suitable source of vacuum which is periodically directed to the port 30 by suitable control means of a type well known to those skilled in the art. The vacuum port, when evacuated, will draw a peripheral edge 20a of the shell into contact with the surface 26. In order to remove all the wrinkles from the shell 20 a connector portion 20b thereon is fit into a recess 32 of a shell retention bar 34. The retention bar 34 is elongated and overlies a cavity 36 in the peripheral surface 28 for housing the shell load mechanism 12.

The retention bar 34 is made of ferromagnetic material or other material which is attracted to a magnetic field force. It includes a flat base 34a which is releasably engageable with a plurality of magnets 38 located in the cavity 36 along the length thereof. A handle 40 is secured to the retention bar 34 on one side thereof by a bent plate member 42.

In use, the shell 20 has its connector portion 20b removably attached to the shell retention bar 34. Vacuum suction is applied through vacuum port 30 to pull the shell 20 flush with the surface 26 of the mold cavity 14 adjacent the peripheral surface 28. The user then pulls the handle 40 to remove any wrinkles therefrom. The magnets 38 hold the retention bar 34 in its adjusted position to maintain tension on the shell 20 required to keep it wrinkle free as the lid 16 is closed. Once the lid 16 is closed, a gasket 44 carried on the lid 16 will engage a shell portion 20a immediately inboard of the shell load mechanism 12. The gasket 44 holds the shell portion 20a flush with the surface portion 28a of the peripheral surface 28 on the mold cavity 14. Once the lid is closed the gasket 44 aids in maintaining a tension on the shell 20 which will keep it wrinkle free during the reaction of the foam precursors thereagainst.

The foam precursors can be poured into the mold cavity 14 when the lid is opened or, alternatively, can be directed through fill nozzle and fill ports (not shown) of a known type into the space following lid closure. In either case, the shell load mechanism 12 of the present invention will be operative to hold the shell 12 with respect to the surface 26 of the mold cavity to remove any wrinkles therefrom and to maintain the shell 12 wrinkle free until it is fully backed by a layer of foamed material bonded thereto. Examples of suitable urethane formulations for forming the foam layer are set-forth in U.S. Pat. No. 3,580,869, with it being understood that the formulations therein are merely illustrative of ones used in forming composite foam parts having a shell cover thereon. Other materials which can be used to foam the part are reaction injection molded (RIM) type nylon, styrene, polyester and olefin, as well as others. The shell 20 can be formed of any suitable thermoformable plastic material such as polyvinyl chloride with it being understood that any suitable conformable cover of plastic, natural or synthetic fabric or other flexible material is equally suitable for use in association with the apparatus of the present invention.

As is conventional practice, the lid and mold cavity parts may have suitable release agents applied thereagainst. The above described load mechanism 12 will lock the shell 20 in place and thereby take the place of presently used tape and other hold down devices. In the past, release materials on the mold apparatus made it difficult to attach such tape hold down systems in place. The load mechanism is not affected by release agents and provides a more reliable hold down of the shell during the mold process so as to prevent wrinkles from forming. The result is a marked reduction in scrap parts.

While the composite product is representatively illustrated as an interior vehicle trim product such as an armrest or an instrument panel, it should be understood that the process is equally suited for use in other products such as luggage, plumbing products or building products requiring smooth, unwrinkled outer surface appearance and a padded feel.

While the invention has been particularly shown and described with respect to preferred embodiments, it will be understood by those skilled in the art that various changes in form and detail may be made without departing from the spirit and scope of the invention, which is encompassed within the following claims.

What is claimed is:

1. Mold apparatus for forming a composite foamed product including a mold cavity having a peripheral portion and a portion adapted to receive and support a shell forming the outer surface of a composite foamed product and further including a lid for closing the mold apparatus following insertion of the shell into the mold cavity and means for directing foam precursors into the mold cavity for reaction therein to form a layer of foam bonded to the back of the shell, wherein said shell includes an integral connector portion characterized by:

magnet means on the mold apparatus adjacent the mold cavity;

tensioning means engageable with the integral connector portion of the shell to pull the shell within the mold cavity to remove wrinkles therefrom, said tensioning means engaging and being locked by said magnet means following removal of wrinkles from the shell to prevent subsequent closure of the lid from drawing the shell into the mold cavity and causing wrinkles in the outer surface of the composite formed product formed by reaction of the foam precursors and bonding of the resultant foam layer to the shell.

2. The mold apparatus of claim 1, further characterized by the magnet means on the mold cavity including a magnet element located in the peripheral portion of the mold cavity.

3. The mold apparatus of claim 1, further characterized by the tensioning means including a retention bar having a recess adapted to interlockingly connect with the integral connector portion of the shell.

4. The mold apparatus of claim 2, further characterized by the tensioning means including a retention bar for connection to the shell and means for drawing said retention bar transversely of said magnet to pull the shell within the mold cavity to remove wrinkles therefrom.

5. The mold apparatus of claim 3, further characterized by the tensioning means including means for drawing the retention bar transversely of said magnet means so as to pull the shell across the mold cavity to remove wrinkles therefrom.

* * * * *